United States Patent
Kanekawa et al.

(10) Patent No.: US 7,680,228 B2
(45) Date of Patent: Mar. 16, 2010

(54) COMMUNICATION SYSTEM, REAL-TIME CONTROL DEVICE, AND INFORMATION PROCESSING SYSTEM

(75) Inventors: Nobuyasu Kanekawa, Hitachi (JP);
Shoji Sasaki, Hitachinaka (JP);
Takanori Yokoyama, Inagi (JP);
Kunihiko Tsunedomi, Hitachi (JP);
Junji Miyake, Hitachinaka (JP);
Katsuya Oyama, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 315 days.

(21) Appl. No.: 10/578,188

(22) PCT Filed: Oct. 1, 2004

(86) PCT No.: PCT/JP2006/014470

§ 371 (c)(1),
(2), (4) Date: Sep. 8, 2008

(87) PCT Pub. No.: WO2005/050464

PCT Pub. Date: Jun. 2, 2005

(65) Prior Publication Data

US 2009/0022255 A1    Jan. 22, 2009

(30) Foreign Application Priority Data

Nov. 5, 2003   (JP) .............................. 2003-376108

(51) Int. Cl.
*H04L 7/02* (2006.01)
(52) U.S. Cl. ..................................... 375/359
(58) Field of Classification Search ................ 375/359, 375/356; 370/222, 405, 452, 258, 338; 710/104, 710/110
See application file for complete search history.

(56) References Cited

U.S. PATENT DOCUMENTS

| | | | | |
|---|---|---|---|---|
| 5,206,857 | A  * | 4/1993 | Farleigh | 370/452 |
| 5,432,823 | A  * | 7/1995 | Gasbarro et al. | 375/356 |
| 6,230,225 | B1 | 5/2001 | Olarig et al. | |
| 6,968,024 | B1* | 11/2005 | Perino | 375/354 |
| 7,372,832 | B2* | 5/2008 | Bevan et al. | 370/329 |
| 2002/0188782 | A1 | 12/2002 | Fay | |
| 2003/0037194 | A1* | 2/2003 | Mukherjee | 710/260 |
| 2005/0216631 | A1* | 9/2005 | Daly et al. | 710/110 |

FOREIGN PATENT DOCUMENTS

| | | |
|---|---|---|
| EP | 1 227 381 A1 | 7/2002 |
| JP | 61-166224 | 7/1986 |
| JP | 62-122354 | 6/1987 |
| JP | 08-223190 | 8/1996 |

OTHER PUBLICATIONS

Data Sheet TLE6230GP, Infineon Technologies AG, Bereichs Kommunikation (Aug. 28, 2000).

(Continued)

*Primary Examiner*—Khai Tran
(74) *Attorney, Agent, or Firm*—Crowell & Moring LLP

(57) ABSTRACT

In addition to fast on-off timing, instructive information on an output wave such as an amplitude or a slope is transmitted through a small number of signal lines. Output wave modifier information such as the amplitude or slope is transferred through serial communication 1, and an on-off timing signal is transmitted as an individual signal 20.

10 Claims, 16 Drawing Sheets

OTHER PUBLICATIONS

XILINX: "Cool Runner Serial Peripheral Interface Master", Dec. 13, 2002, XP002342030, retrieved from the Internet on Aug. 26, 2005 at http://direct.xilinx.com/bvdocs/appnotes/xapp348.pdf.

Wettroth, J., "Serial-Control Multiplexer Expands SPI Chip Selects", Electronic Design, Penton Media, Cleveland, Ohio, US, vol. 46, No. 7, Mar. 23, 1998, p. 128, 130, XP000780460.

Partial European Search dated Jun. 4, 2007 for 04791937.8.

International Preliminary Report on Patentability for PCT/JP2004/014470 dated Jul. 27, 2006.

Supplementary European Search Report dated Oct. 1, 2007 (Five (5) pages).

* cited by examiner

FIG. 6

| case | TXCSi# | | | RXCSi# | | | MASTER → SLAVE 1 | MASTER → SLAVE 2 | MASTER → SLAVE n | SLAVE 1 → MASTER | SLAVE 2 → MASTER | SLAVE n → MASTER |
|---|---|---|---|---|---|---|---|---|---|---|---|---|
| | 1 | 2 | n | 1 | 2 | n | | | | | | |
| 1 | OFF | OFF | OFF | * | * | * | INACTIVE | INACTIVE | INACTIVE | — | — | — |
| 2 | ON | OFF | OFF | * | * | * | ACTIVE | INACTIVE | INACTIVE | — | — | — |
| 3 | OFF | ON | OFF | * | * | * | INACTIVE | ACTIVE | INACTIVE | — | — | — |
| 4 | ON | ON | OFF | * | * | * | ACTIVE | ACTIVE | INACTIVE | — | — | — |
| 5 | OFF | OFF | ON | * | * | * | INACTIVE | INACTIVE | ACTIVE | — | — | — |
| 6 | ON | OFF | ON | * | * | * | ACTIVE | INACTIVE | ACTIVE | — | — | — |
| 7 | OFF | ON | ON | * | * | * | INACTIVE | ACTIVE | ACTIVE | — | — | — |
| 8 | ON | ON | ON | * | * | * | ACTIVE | ACTIVE | ACTIVE | — | — | — |
| 9 | * | * | * | OFF | OFF | OFF | — | — | — | INACTIVE | INACTIVE | INACTIVE |
| 10 | * | * | * | ON | OFF | OFF | — | — | — | ACTIVE | INACTIVE | INACTIVE |
| 11 | * | * | * | OFF | ON | OFF | — | — | — | INACTIVE | ACTIVE | INACTIVE |
| 12 | * | * | * | ON | ON | OFF | — | — | — | INHIBITED | INHIBITED | INACTIVE |
| 13 | * | * | * | OFF | OFF | ON | — | — | — | INACTIVE | INACTIVE | ACTIVE |
| 14 | * | * | * | ON | OFF | ON | — | — | — | INHIBITED | INHIBITED | INHIBITED |
| 15 | * | * | * | OFF | ON | ON | — | — | — | INHIBITED | INHIBITED | INHIBITED |
| 16 | * | * | * | ON | ON | ON | — | — | — | INHIBITED | INHIBITED | INHIBITED |
| 17 | ON | OFF | OFF | OFF | OFF | OFF | ACTIVE | INACTIVE | INACTIVE | INACTIVE | INACTIVE | INACTIVE |
| 18 | OFF | OFF | OFF | ON | OFF | OFF | INACTIVE | INACTIVE | INACTIVE | ACTIVE | INACTIVE | INACTIVE |
| 19 | ON | ON | OFF | ON | OFF | OFF | ACTIVE | ACTIVE | INACTIVE | ACTIVE | INACTIVE | INACTIVE |
| 20 | ON | OFF | OFF | OFF | OFF | ON | ACTIVE | INACTIVE | INACTIVE | ACTIVE | INACTIVE | INACTIVE |
| 21 | ON | OFF | OFF | OFF | OFF | ON | ACTIVE | INACTIVE | INACTIVE | INACTIVE | INACTIVE | INACTIVE |

*: don't care

FIG. 8

| case | CS# 1 | CS# 2 | CS# n | T/TR# | MASTER → SLAVE 1 | MASTER → SLAVE 2 | MASTER → SLAVE n | SLAVE 1 → MASTER | SLAVE 2 → MASTER | SLAVE n → MASTER |
|---|---|---|---|---|---|---|---|---|---|---|
| 1 | OFF | OFF | OFF | T | INACTIVE | INACTIVE | INACTIVE | INACTIVE | INACTIVE | INACTIVE |
| 2 | ON | OFF | OFF | T | ACTIVE | INACTIVE | INACTIVE | INACTIVE | INACTIVE | INACTIVE |
| 3 | OFF | ON | OFF | T | INACTIVE | ACTIVE | INACTIVE | INACTIVE | INACTIVE | INACTIVE |
| 4 | ON | ON | OFF | T | ACTIVE | ACTIVE | INACTIVE | INACTIVE | INACTIVE | INACTIVE |
| 5 | OFF | OFF | ON | T | INACTIVE | INACTIVE | ACTIVE | INACTIVE | INACTIVE | INACTIVE |
| 6 | ON | OFF | ON | T | ACTIVE | INACTIVE | ACTIVE | INACTIVE | INACTIVE | INACTIVE |
| 7 | OFF | ON | ON | T | INACTIVE | ACTIVE | ACTIVE | INACTIVE | INACTIVE | INACTIVE |
| 8 | ON | ON | ON | T | ACTIVE | ACTIVE | ACTIVE | INACTIVE | INACTIVE | INACTIVE |
| 9 | OFF | OFF | OFF | TR# | INACTIVE | INACTIVE | INACTIVE | INACTIVE | INACTIVE | INACTIVE |
| 10 | ON | OFF | OFF | TR# | ACTIVE | INACTIVE | INACTIVE | ACTIVE | INACTIVE | INACTIVE |
| 11 | OFF | ON | OFF | TR# | INACTIVE | ACTIVE | INACTIVE | INACTIVE | ACTIVE | INACTIVE |
| 12 | ON | ON | OFF | TR# | ACTIVE | ACTIVE | INACTIVE | INHIBITED | | |
| 13 | OFF | OFF | ON | TR# | INACTIVE | INACTIVE | ACTIVE | INACTIVE | INACTIVE | ACTIVE |
| 14 | ON | OFF | ON | TR# | ACTIVE | INACTIVE | ACTIVE | INHIBITED | | |
| 15 | OFF | ON | ON | TR# | INACTIVE | ACTIVE | ACTIVE | INHIBITED | | |
| 16 | ON | ON | ON | TR# | ACTIVE | ACTIVE | ACTIVE | INHIBITED | | |

FIG. 10

| case | CS# 1 | CS# 2 | CS# n | R/TR# | MASTER→SLAVE 1 | MASTER→SLAVE 2 | MASTER→SLAVE n | SLAVE 1→MASTER | SLAVE 2→MASTER | SLAVE n→MASTER |
|---|---|---|---|---|---|---|---|---|---|---|
| 1 | OFF | OFF | OFF | R | INACTIVE | INACTIVE | INACTIVE | INACTIVE | INACTIVE | INACTIVE |
| 2 | ON | OFF | OFF | R | INACTIVE | INACTIVE | INACTIVE | ACTIVE | INACTIVE | INACTIVE |
| 3 | OFF | ON | OFF | R | INACTIVE | INACTIVE | INACTIVE | INACTIVE | ACTIVE | INACTIVE |
| 4 | ON | ON | OFF | R | INACTIVE | INACTIVE | INACTIVE | INHIBITED | | |
| 5 | OFF | OFF | ON | R | INACTIVE | INACTIVE | INACTIVE | INACTIVE | INACTIVE | ACTIVE |
| 6 | ON | OFF | ON | R | INACTIVE | INACTIVE | INACTIVE | INHIBITED | | |
| 7 | OFF | ON | ON | R | INACTIVE | INACTIVE | INACTIVE | INHIBITED | | |
| 8 | ON | ON | ON | R | INACTIVE | INACTIVE | INACTIVE | INHIBITED | | |
| 9 | OFF | OFF | OFF | TR# | INACTIVE | INACTIVE | INACTIVE | INACTIVE | INACTIVE | INACTIVE |
| 10 | ON | OFF | OFF | TR# | ACTIVE | INACTIVE | INACTIVE | ACTIVE | INACTIVE | INACTIVE |
| 11 | OFF | ON | OFF | TR# | INACTIVE | ACTIVE | INACTIVE | INACTIVE | ACTIVE | INACTIVE |
| 12 | ON | ON | OFF | TR# | ACTIVE | ACTIVE | INACTIVE | INHIBITED | | |
| 13 | OFF | OFF | ON | TR# | INACTIVE | INACTIVE | ACTIVE | INACTIVE | INACTIVE | ACTIVE |
| 14 | ON | OFF | ON | TR# | ACTIVE | INACTIVE | ACTIVE | INHIBITED | | |
| 15 | OFF | ON | ON | TR# | INACTIVE | ACTIVE | ACTIVE | INHIBITED | | |
| 16 | ON | ON | ON | TR# | ACTIVE | ACTIVE | ACTIVE | INHIBITED | | |

COMMUNICATION SYSTEM, REAL-TIME CONTROL DEVICE, AND INFORMATION PROCESSING SYSTEM

TECHNICAL FIELD

The present invention relates to control device. More particularly, the present invention is concerned with control device preferably adapted to real-time control, that is, real-time control device, a communication system permitting high-speed communication in the real-time control device, and control device and an information processing system which include the communication system.

BACKGROUND ART

Along with sophistication of features of electronic device, the wiring in a wiring board is getting more complex and the number of wiring is increasing. On the other hand, the compactness of the electronic device is demanded from the viewpoint of convenience. In efforts to satisfy such inconsistent requests, a means for transmitting signals in the form of serial data so as to reduce the number of wiring has been adopted in the past. A protocol or method "serial peripheral interface (SPI)" stipulating channels in control device, or more particularly, communications among a micro-processing unit and peripheral input/output (I/O) devices has prevailed in the past. Document 1 "Data Sheet TLE4230 GP (Infineon Technologies AG, Bereichs Kommunikation, Aug. 28, 2000)" describes an example of a peripheral input/output device (output driver) using an SPI. A power element described in Document 1 or the like can control the output thereof via either an SPI or an individual signal line. According to the method, an output whose on-off cycle is long such as an output of a relay is controlled through serial communication represented by the SPI method. Consequently, the number of signal lines to be used for control can be largely reduced. Moreover, an output that repeats on-off at intervals of a short cycle such as an output of a pulse-width modulator (PWM) is controlled as an individual signal. Consequently, fast on-off can be achieved during serial communication without the necessity of overhead. Moreover, related arts relating to transfer of serial data synchronous with a clock include the one described in conjunction with FIG. 15 in Document 2 (Japanese Unexamined Patent Publication No. 61-166244).

Non-patent Document 1: Data Sheet TLE4230 GP, Infineon Technologies AG, Bereichs Kommunikation (Aug. 28, 2000)

Patent Document 1: Japanese Unexamined Patent Publication No. 61-166244

DISCLOSURE OF INVENTION

The foregoing related arts are effective in controlling simple on-off. However, further study is needed for control of a fast and complex output. For example, the related arts cannot cope with a case where not only simple on-off but also an output waveform such as an amplitude or a slope or should be controlled.

The SPI is an excellent method that can be implemented by simple hardware or software because a master is fixed, an arbitration preceding communication is unnecessary, and a communicating party is designated with a chip select signal. Specifically, a slave node is selected with a slave node selection signal (chip select signal), and transmission (transfer) from a master node to the slave node and transfer (reception) from the slave node to the master node are performed concurrently between the master node and the selected slave node. However, the SPI supports only one one-to-one communication because it preconditions communication between a micro-processing unit and a peripheral I/O device. The SPI does not support one-to-multiple communication, that is, broadcast. When an attempt is made to realize broadcast according to the SPI, if chip select signals to be sent to a plurality of slave nodes are activated, the slave nodes can receive a signal sent from the master but signals the plurality of slave nodes attempt to transmit to the master collide with one another.

A concept of autonomous decentralization that is widely introduced into fields of control makes it pivotal how nodes responsible for control share information. For sharing information, a broadcast feature is needed. Moreover, when communication among a plurality of micro-processing units other than communication between a micro-processing unit and a peripheral I/O device is taken into account, the broadcast feature is needed by all means. Moreover, according to a related art described in conjunction with FIG. 15 in Japanese Unexamined Patent Publication No. 61-166244, when signals RQI1 and RQI2 are activated, the broadcast feature is thought to be able to be implemented. However, since slave CPUs transmit respective signals RQO (a master CPU transmits signals RQO1 and RQO2), serial signals SO sent from the slave CPUs to the master CPU may collide with one another.

The present invention addresses the problems underlying the related arts. The first object of the present invention is to provide a method for transmitting instructive information on an output wave such as an amplitude or a slope in addition to fast on-off timing through a small number of signal lines. The second object of the present invention is to provide a communication system that implements a broadcast feature while making the most of the simplicity characterizing the related arts.

In order to accomplish the first object, the present invention transmits instructive information of output waves such as amplitude or slope (hereinafter referred to as "output wave modifier information") through serial communication, and transmits on-off timing through an individual signal.

In order to accomplish the second object, the present invention transmits a signal, with which either of transmission and reception is selected, in addition to a slave node selection signal (chip select signal). Specifically, a group of communication selection signals each signifying whether a slave node is selected as a party of signal transfer to or from the master node and a direction of communication, is transmitted from the master node to the slave nodes.

Various methods are conceivable as a method of encoding the group of communication selection signals and are broadly classified into two methods described below.

(1) Method in which a slave node selection signal (chip select signal) is used in each of transmission and reception (2) Method in which a selection signal signifying a direction of communication is used in addition to the slave node selection signal (chip select signal)

(a) EXAMPLE 1

Selection signal signifying a direction of communication=L: reception
Selection signal signifying a direction of communication=H: concurrent transmission and reception

(b) EXAMPLE 2

Selection signal signifying a direction of communication=L: transmission
Selection signal signifying a direction of communication=H: concurrent transmission and reception

(c) EXAMPLE 3

Selection signal signifying a direction of communication=L: transmission
Selection signal signifying a direction of communication=H: reception

(d) EXAMPLE 4

Selection signals signifying a direction of communication=H and L: transmission
Selection signals signifying a direction of communication=L and H: reception Selection signals signifying a direction of communication=H and H: concurrent transmission and reception Among the above methods, the method (1) offers a high degree of freedom because it makes it possible to select a direction of communication for each slave node.

A communication system in accordance with the present invention based on the method (1) comprises a master node and a plurality of slave nodes. Herein, the master node and the slave nodes are communicated with one another. The master node comprises: a clock transmission means for transmitting a clock signal to the plurality of slave nodes; a means for transmitting a first selection signal, which signifies whether a slave node is selected as a party of signal transmission from the master node, to each of the slave nodes; a means for transmitting a second selection signal, which signifies whether a slave node is selected as a party of signal transmission to the master node, to each of the slave nodes under the condition that at most one slave node should be selected simultaneously; a means for transmitting data to the plurality of slave nodes synchronously with the clock signal; and a means for receiving data from a slave node synchronously with the clock.

Each of the slave nodes comprises a means for, when the slave node is selected with the first selection signal, receiving data sent from the master node synchronously with the clock signal, and a means for, when the slave node is selected with the second selection signal, transmitting data to the master node synchronously with the clock signal.

Control device in accordance with the present invention comprises a master node, a plurality of slave nodes, actuators connected to the respective slave nodes via respective pieces of switching means, and a communication system which the master node and slave nodes communicate with one another. The control device controls the actuators in response to instructions issued from the master node, and includes the master node and slave nodes.

Moreover, an information processing system in accordance with the present invention comprises a master node which includes a microprocessor and performs information processing, a plurality of slave nodes each of which includes a microprocessor and performs information processing, and a communication system which the master node and slave nodes communicate with one another. The information processing system includes the master node and slave nodes.

According to the present invention, the plurality of slave nodes can receive a transmission signal sent from the master node, and reception signals which are transmitted from the respective slave nodes to the master node will not conflict with one another. Namely, a broadcast feature can be implemented.

BRIEF DESCRIPTION OF THE DRAWINGS

FIG. 6 is an explanatory diagram concerning settings of signals TXCSi# and RXCSi# and communicating actions;

FIG. 8 is an explanatory diagram concerning settings of signals CSi# and T/TR# and communicating actions;

FIG. 10 is an explanatory diagram showing settings of signals CSi# and R/TR# and communicating actions;

BEST MODE FOR CARRYING OUT THE INVENTION

Figure 1:
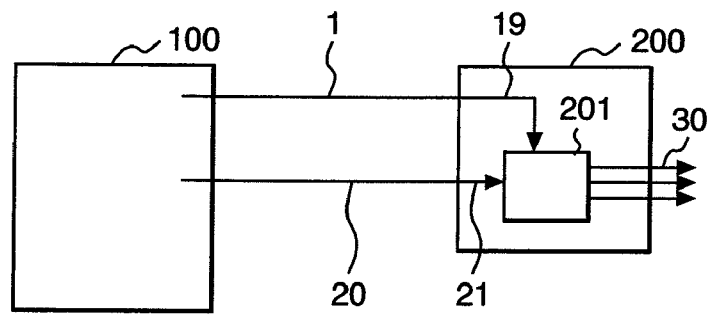
FIG. 1 shows a fundamental embodiment of the present invention.

Referring to the drawings, embodiments of the present invention will be described below.

FIG. 1 shows an example of a fundamental configuration of the present invention. A serial channel 1 and an individual signal 20 link from a main processor (that may be called a main node or a master node) 100 to an I/O processor (that may be called an I/O device, I/O node, or slave node) 200. Output wave modifier information 19 is transmitted through the serial channel 1, and output timing information 21 is transmitted through the individual signal 20. An output control unit 201 outputs an output 30 based on the output wave modifier information 19 at the timing when the output timing information 21 is took in.

A serial peripheral interface (SPI) or the like is provided for serial communication to be performed in a control device or the like. The present invention does not depend on the type of serial communication. Therefore, in this specification, a description of serial communication types will be omitted.

According to the present embodiment, in addition to the fast on/off timing of a signal sent from the main processor 100 to the I/O processor (or I/O device) 200, instructive information of such as an amplitude or slope on output wave can be transmitted via a small number of signal lines. Consequently, function assignments are achieved in such a manner that the main processor 100 is responsible for overall control of an output and the I/O processor (or I/O device) 200 is responsible for fine control of the output. Eventually, the performance of the control device improves.

Figure 2:
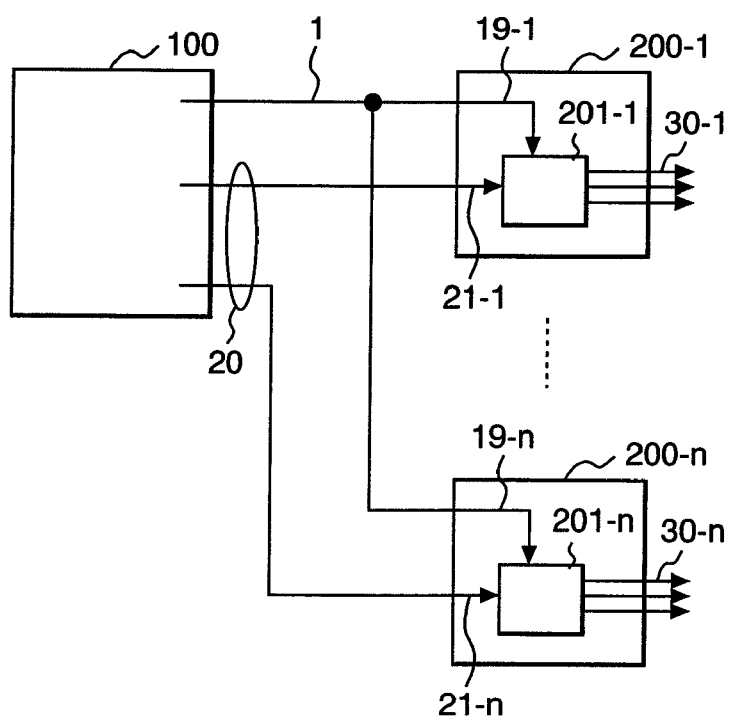
FIG. 2 shows an embodiment in which a plurality of I/O processors are connected to a main processor.

FIG. 2 shows an embodiment in which a plurality of I/O processors (or I/O devices) 200-1 to 200-n are connected to the main processor 100. Output wave modifier information 19-1 to 19-n are transmitted through a common serial channel 1, and Output timing information 21-1 to 21-n are transmitted through individual signals 20-1 to 20-n.

According to the present embodiment, the performance of a control system with more output ports than the embodiment shown in FIG. 1 can be improved.

Figure 3:
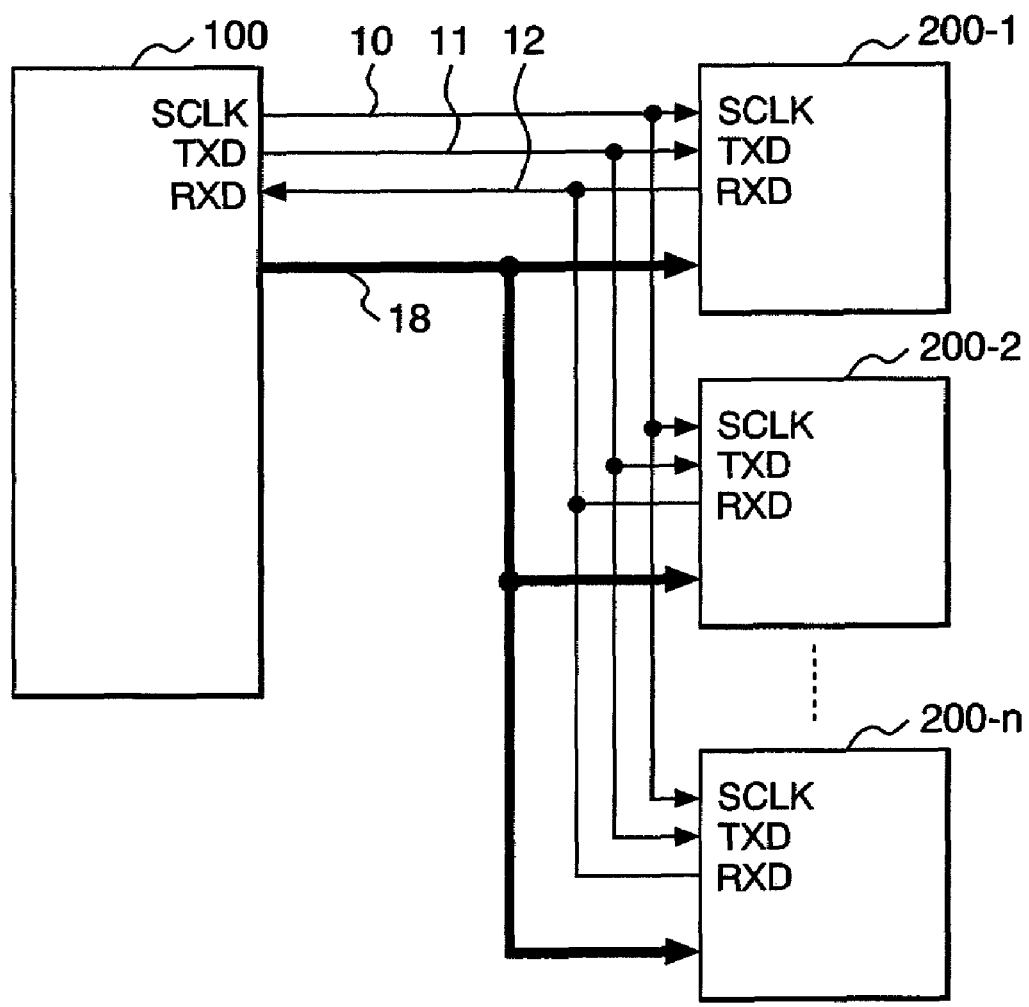
FIG. 3 shows an embodiment permitting serial communication preferably employed in the present invention.

FIG. 3 shows an embodiment permitting serial communication preferably adapted to the present invention. A master node (main processor) 100 is connected to slave nodes (I/O processors) 200-1 to 200-n with signal lines (SCLK10, TXD11, RXD12) and a group of communication selection signals (selection signals each signifying whether a slave node is selected as a party of the signal transmission to or from the master node, and each signifying a direction of communication) 18.

TXD11 denotes a transmission signal to be sent from the master node (main processor) 100 to the slave nodes (I/O processors) 200-1 to 200-n, and RXD12 denotes a reception signal to be sent from any of the slave nodes (I/O processors) 200-1 to 200-n to the masternode (main processor) 100. SCLK10 denotes a clock used for transmitting the signals TXD11 and RXD12. For example, the signals TXD11 and RXD12 are transmitted at a leading edge of the clock SCLK10, and are latched at the trailing edge of the clock SCLK10. Otherwise, in reverse, the signals TXD11 and RXD12 are transmitted at the trailing edge of the clock SCLK10, and are latched at the leading edges of the clock SCLK10. A slave node to be a destination for the signal TXD11 and be capable of transmitting the signal RXD12 are designated with the group of communication selection signals 18. A designation method using the group of communication selection signals 18 will be presented in embodiments shown in FIG. 4 to FIG. 10.

Figure 4:
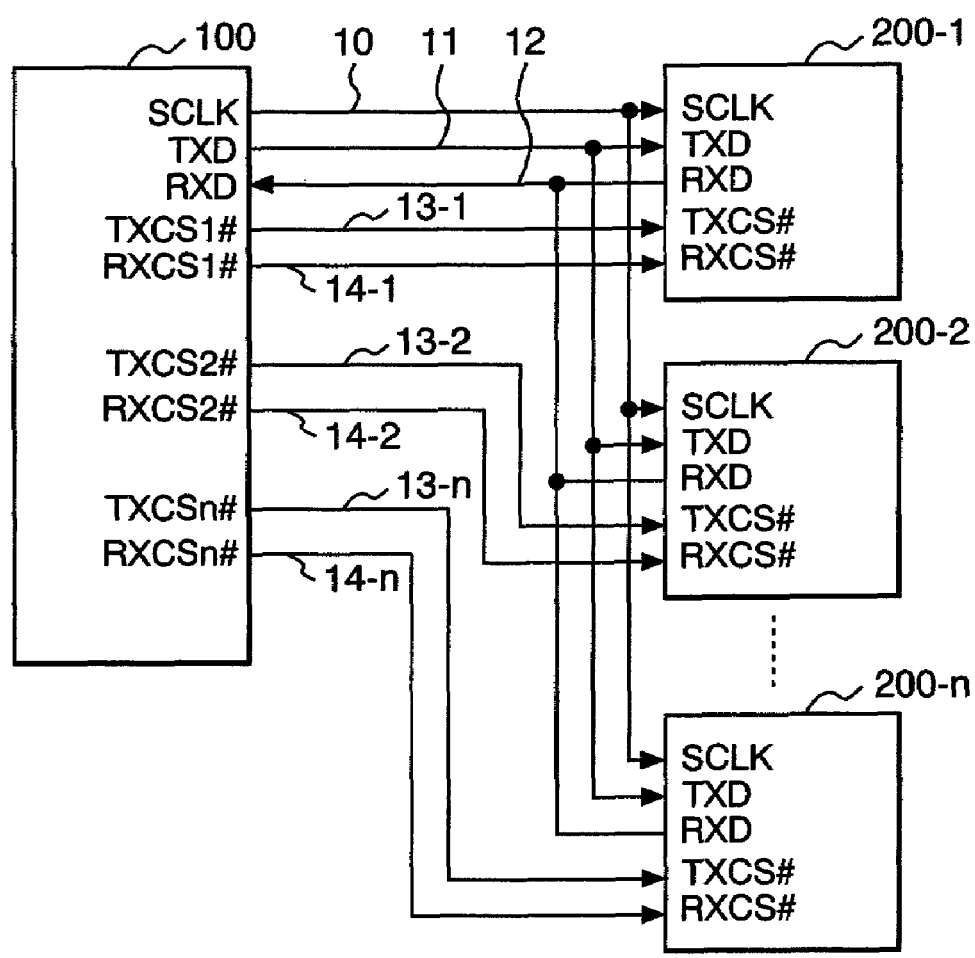
FIG. 4 shows an example of a configuration for controlling communication using signals TXCSi# and RXCSi#.

FIG. 4 shows an embodiment in which the group of communication selection signals 18 include signals TXCS1#(13-1) to TXCSn#(13-n) and signals RXCS1#(14-1) to RXCSn#(14-n). The master node (main processor) 100 is connected to the slave nodes (I/O processors) 200-1 to 200-n through signal lines (SCLK10, TXD11, RXD12, TXCS1#(13-1) to TXCSn#(13-n), and RXCS1#(14-1) to RXCSn#(14-n)).

Incidentally, # trailing a signal name signifies that the signal is active low, that is, the signal is enable when its level is in low. In logical circuits of transistor-transistor logic (TTL) level, a threshold relative to which a low level is recognized is so low that a signal is rarely erroneously recognized as a low-level signal due to an electric noise. Owing to this property, an active-low signal is, as it is in the present embodiment, generally adopted as a strobe, a chip select signal, or the like in order to intensity the anti-noise property. If a logical circuit in which a threshold relative to which a high level is recognized is higher than a normal one is adopted, or if the anti-noise property need not be cared especially, an active-high signal, that is, a signal that is enable when its level is in high may be adopted. In this description, embodiments in which the active-low signal is adopted as the group of communication selection signals 18 will be described.

TXCS1#(13-1) to TXCSn#(13-n) denote chip select signals that the transmission signal TXD11, and each signifies that the transmission signal TXD11 is transmitted to an associated slave node. For example, when the signal TXCS1#(13-1) is enable (low), it signifies that the transmission signal TXD11 is transmitted to the slave node (I/O processor) 200-1. Incidentally, among the signals TXCS1#(13-1) to TXCSn#(13-n), a plurality of signals may be enable (low).

RXCS1#(14-1) to RXCSn#(14-n) denote chip select signals relevant to the reception signal RXD12, and each signify that an associated slave node transmits the signal RXD12. For example, when the signal RXCS1#(14-1) is enable (low), the slave node (I/O processor) 200-1 alone transmits the signal RXD12. If a plurality of slave nodes simultaneously transmit the signal RXD12, the signals conflict with each other. Therefore, among the signals RXCS1#(14-1) to RXCSn#(14-n), a plurality of signals should not be enable (low).

Figure 5:
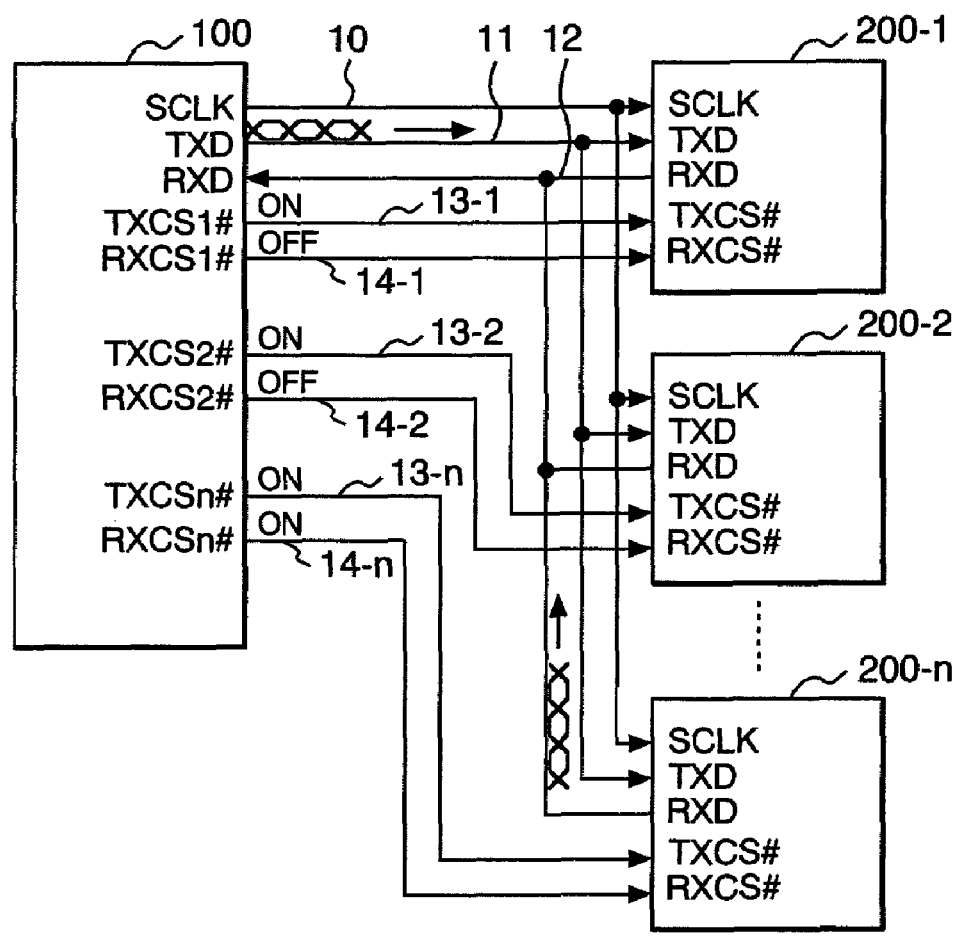
FIG. 5 shows an example of actions to be performed (broadcast) in a communication system shown in FIG. 4.

FIG. 5 shows an example of actions to be performed in the communication system shown in FIG. 4. In the present embodiment, the signals TXCS1#(13-1) to TXCSn#(13-n) are all on (low). Among the signals RXCS1#(14-1) to RXCSn#(14-n), the signal RXCSn#(14-n) alone is on (low), and the other signals are off (high). At this time, the signal TXD11 is transmitted to all the slave nodes (I/O processors) 200-1 to 200-n, and the slave node (I/O processor) 200-n alone transmits the signal RXD12. According to the present embodiment, the master node (main processor) 100 can transmit information to all the slave nodes (I/O processors) 200-1 to 200-n at a time, and can receive the signal from the specific slave node (I/O processor) 200-n alone.

FIG. 6 shows a method of designating the signals TXCS1# (13-1) to TXCSn#(13-n) and RXCS1#(14-1) to RXCSn#(14-n) and communicating actions. On pertains to active (low), and off pertains to inactive (high).

First of all, any combinations of the signals TXCS1#(13-1) to TXCSn#(13-n) can be made as represented as cases 1 to 8. As for the signals RXCS1#(14-1) to RXCSn#(14-n), combinations in which at most one signal is "on" can be made as presented as cases 9 to 16. Combinations in which the other signals are "on" are inhibited because the signals sent from slave nodes cause confliction with each other.

As presented in case 17, the master node (main processor) may merely transmit data to the slave nodes but the slave nodes may not transmit data to the master node (main processor). In reverse, as presented in case 18, a slave node may merely transmit data to the master node (main processor) but the master node (main processor) may not transmit data to the slave nodes.

Moreover, as presented in case 19, while the master node (main processor) is transmitting data to all the slave nodes, a specific slave node may transmit data to the master node (main processor). As presented in case 20, the master node may, as conventionally, exchange data with the same slave node. As presented in case 21, a slave node different from a slave node to which the master node (main processor) transmits data may transmit data to the master node.

Figure 7:
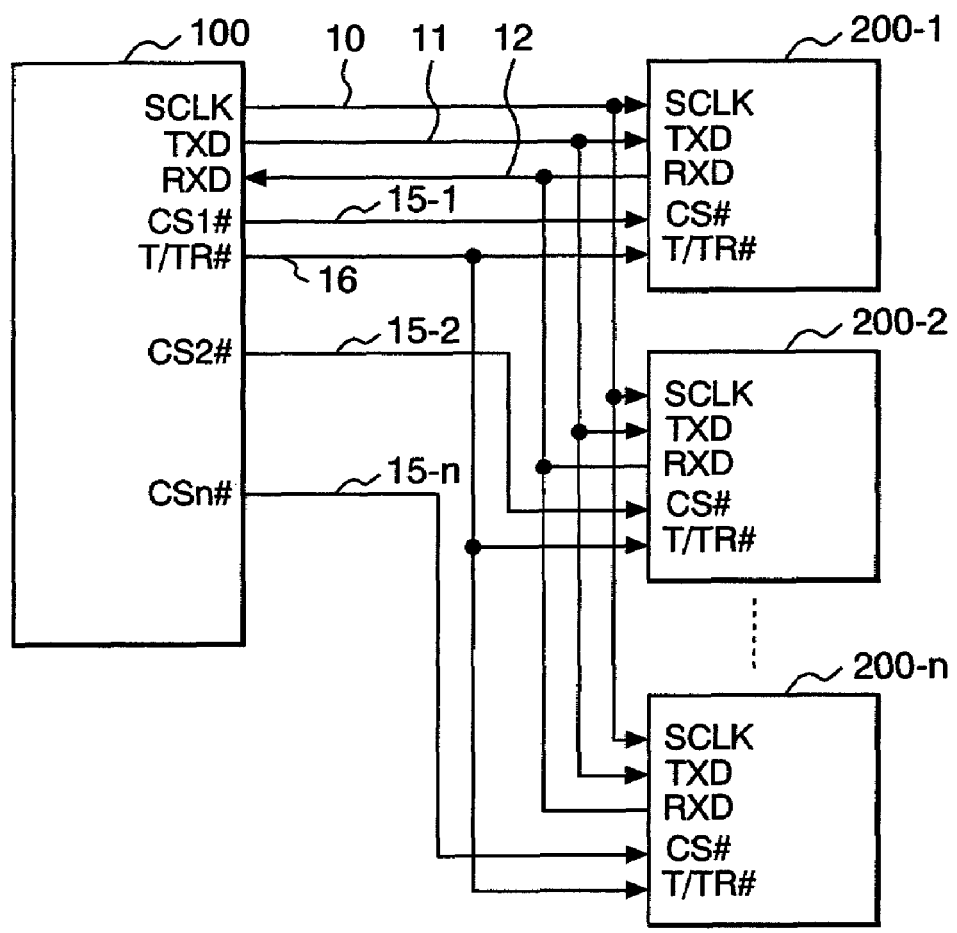
FIG. 7 shows an example of a configuration for controlling communication using signals CSi# and T/TR#.

FIG. 7 shows an embodiment in which the group of communication selection signals 18 includes signals on signal lines CS1#(15-1) to CSn#(15-n) and T/TR#(16). The signals on the signal lines CS1#(15-1) to CSn#(15-n) are chip select signals to be transmitted to associated slave nodes. In the present embodiment, since active-low logic is adopted, when signals are low, they are active and each low level signal signifies that an associated slave node is selected as a party of communication with the master node (main processor). A signal on the signal line T/TR#(16) is a signal for signifying a direction of communication. When the signal of T/TR#(16) is high, transfer (transmission) from the master node (main processor) 100 to the slave nodes (I/O processors) 200-1 to 200-n is active. When the signal of T/TR# (16) is in low level, both transmission (sending from the master node) from the master node (main processor) 100 to the slave nodes (I/O processors) 200-1 to 200-n, and transmission (receiving at the master node) from the slave nodes (I/O processors) 200-1 to 200-n to the master node (main processor) 100 are active.

Using these two signals, the communications between the master node (main processor) 100 and slave nodes (I/O processors) 200-1 to 200-n are controlled as shown in FIG. 8. As presented in cases 1 to 8, when T is specified in T/TR#, that is, the signal T/TR#(16) is in low level, only transmission (sending at the master node) from the master node (main processor) 100 to the slave nodes (I/O processors) 200-1 to 200-n is active. At this time, transmission to any slave nodes is enabled. Moreover, as presented in cases 9 to 16, when TR# is specified in T/TR#, that is, the signal T/TR#(16) is in low level, only one slave node (I/O processor) 200-i can be selected as a party of communication with the master node for preventing confliction of transmissions (receiving at the master node) from the slave nodes (I/O processors) 200-1 to 200-n to the master node (main processor) 100.

Figure 9:
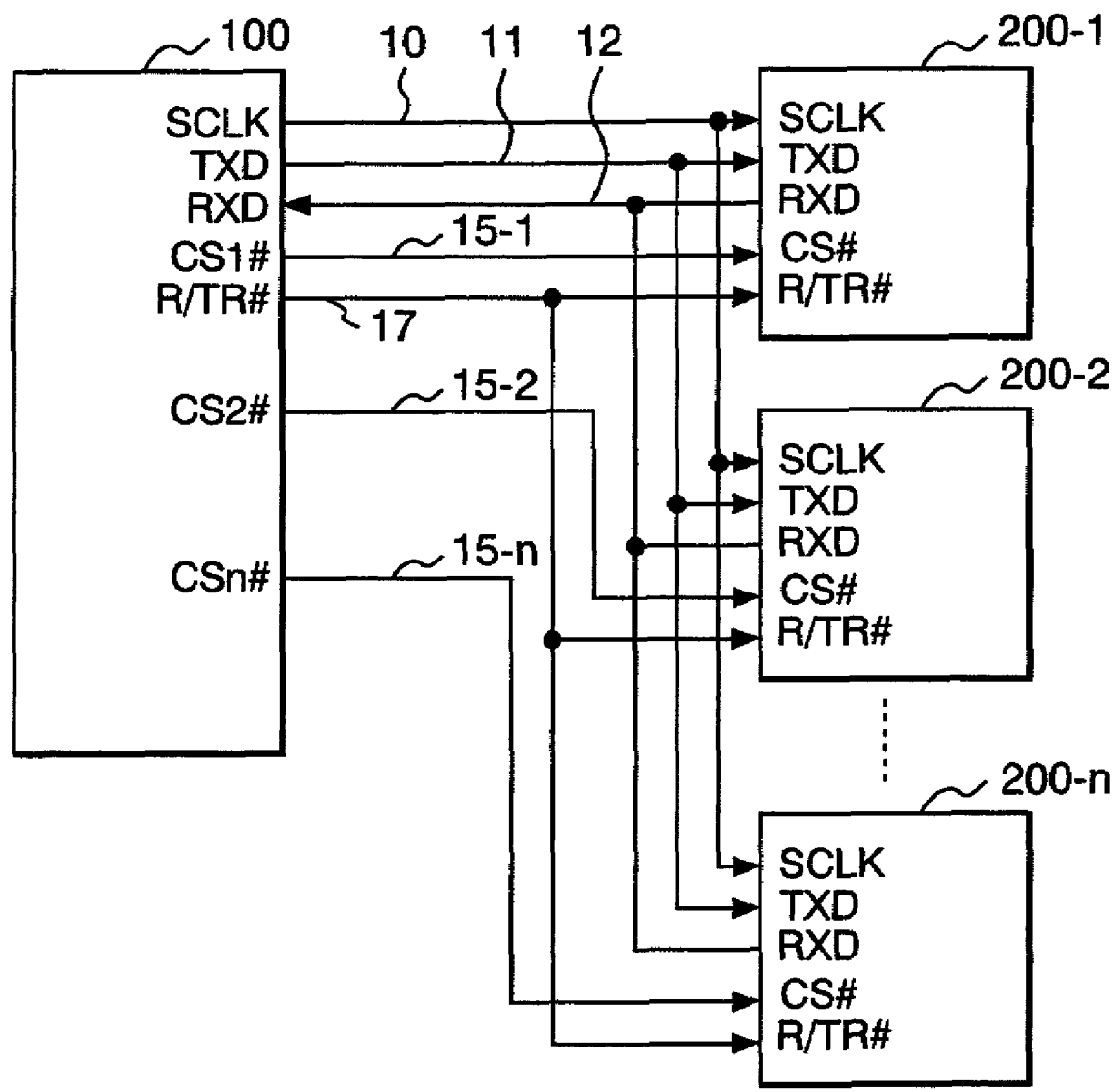
FIG. 9 shows an example of a configuration for controlling communication using signals CSi# and R/TR#.

FIG. 9 shows an embodiment in which the group of communication selection signals 18 includes signals on signal lines CS1#(15-1) to CSn#(15-n) and R/TR#(17). The signals on the signal lines CS1#(15-1) to CSn#(15-n) are chip select signals associated with the respective slave nodes. In the present embodiment, since active-low logic is adopted, when the signals of CS1#(15-1) to CSn#(15-n) are in low level, they are active and signify that an associated slave node is selected as a party of communication with the master node (main processor). The signal on the signal line R/TR#(17) is a signal signifying a direction of communication. When the signal of R/TR#(17) is high, transmission (receiving at the master node) from the slave nodes (I/O processors) 200-1 to 200-n to the maser node (main processor) 100 is active. When the signal of R/TR#(17) is in low level, transmission (sending at the master node) from the maser node (main processor) 100 to the slave nodes (I/O processors) 200-1 to 200-n and transmission (receiving at the master node) from the slave nodes (I/O processors) 200-1 to 200-n to the master node (main processor) 100 are active.

Using these two signals, the communications among the master node (main processor) 100 and slave nodes (I/O processors) 200-1 to 200-n are controlled as shown in FIG. 10. As presented in cases 1 to 8, when R is specified in R/TR#, that is, the signal R/TR#(17) is in high level, only transmission (receiving at the master node) from the slave nodes (I/O processors) 200-1 to 200n to the master node (main processor) 100 is active. As presented in cases 9 to 16, when TR# is specified in R/TR#, that is, the signal R/TR#(17) is in low level, transmission (sending at the master node) from the master node (main processor) 100 to the slave nodes (I/O processors) 200-1 to 200-n and transmission (receiving at the master node) from the slave nodes (I/O processors) 200-1 to 200-n to the master node (main processor) 100 are active.

In either case, when transmitting from the slave nodes (I/O processors) 200-1 to 200n to the master node (main processor) 100, only one slave node (I/O processor) 200-i can be selected as a party of communication with the master node for preventing confliction of transmissions (receiving at the master node) from the slave nodes (I/O processors) 200-1 to 200n to the master node (main processor) 100.

Figure 11:
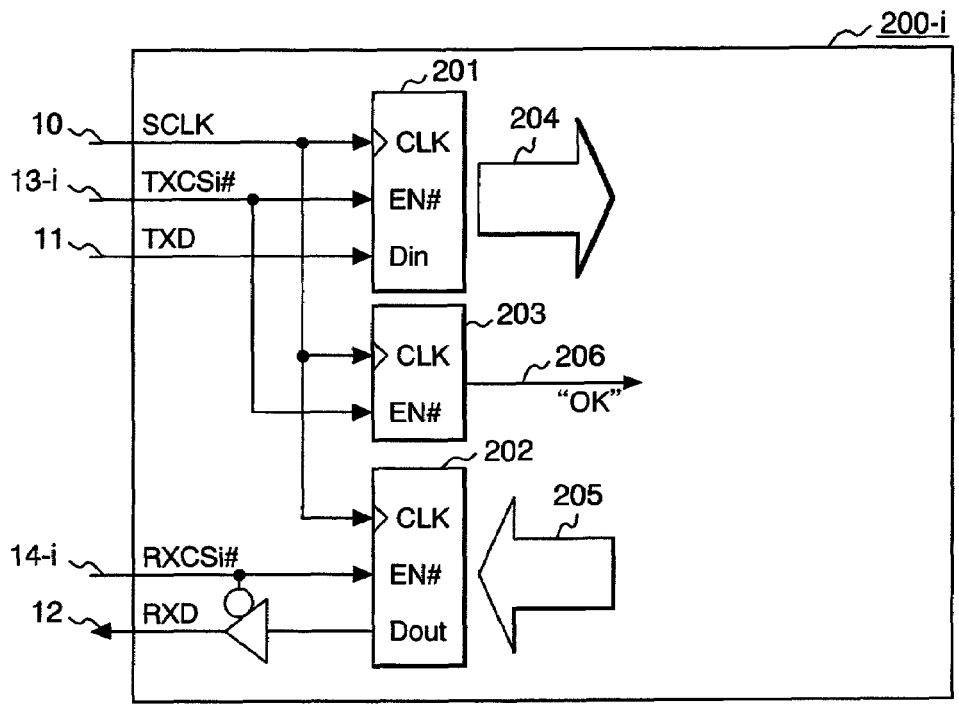
FIG. 11 shows an example of the configuration of a slave node.

FIG. 11 shows an example of the configuration of a slave node. A slave node (I/O processor) 200-i of this example includes a serial-parallel converter 201 and a parallel-serial converter 202. When a signal TXCSi# is active (low), the serial-parallel converter 201 converts a signal TXD11, which is sent in the form of serial data, into parallel data 204 according to a clock SCLK10. When a signal RXCSi# is active (low), the parallel-serial converter 202 converts parallel data 205 to serial data according to the clock SCLK10, and transmits the serial data as a signal RXD12. Moreover, as shown in FIG. 11, the slave node may include a state transition monitor 203. The state transition monitor 203 counts the number of pulses of the clock SCLK10 during a period where the signal TXCSi# remains active (low). When the number of clock pulses equals a predetermined number of clock pulses, the state transition monitor 203 transmits "OK" as a result of monitoring 206.

Figure 12:
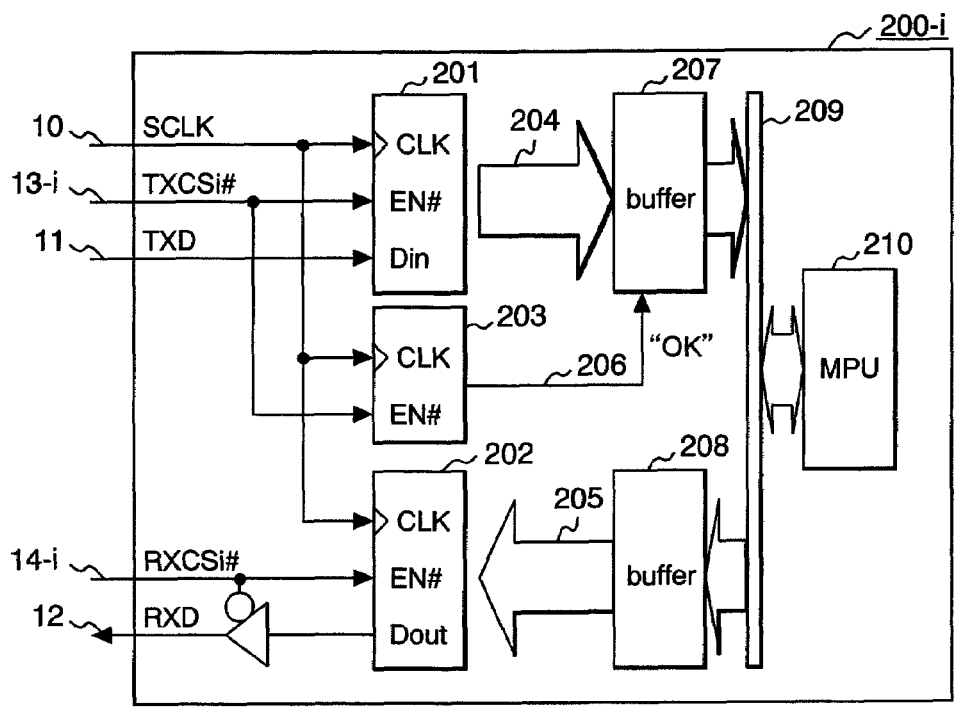
FIG. 12 shows an example of the configuration of a slave node including a micro-processing unit.

FIG. 12 shows another example of the configuration of a slave node. A slave node (I/O processor) 200-i of this example includes a micro-processing unit (MPU) 210. Reception data converted into parallel data 204 by the serial-parallel converter 201 is stored in a buffer 207 when the result of monitoring 206 performed by the state transition monitor 203 demonstrates that the number of clock pulses SCLK10 reaches the predetermined value. The reception data is read into the MPU 210 through a bus 209 in response to a request issued from the MPU 210. On the other hand, transmission data is written in a buffer 208 through the bus 209 by the MPU 210, transferred as parallel data 205 to the parallel-serial converter 202, converted into serial data, and then transmitted as a signal RXD12.

Figure 13:
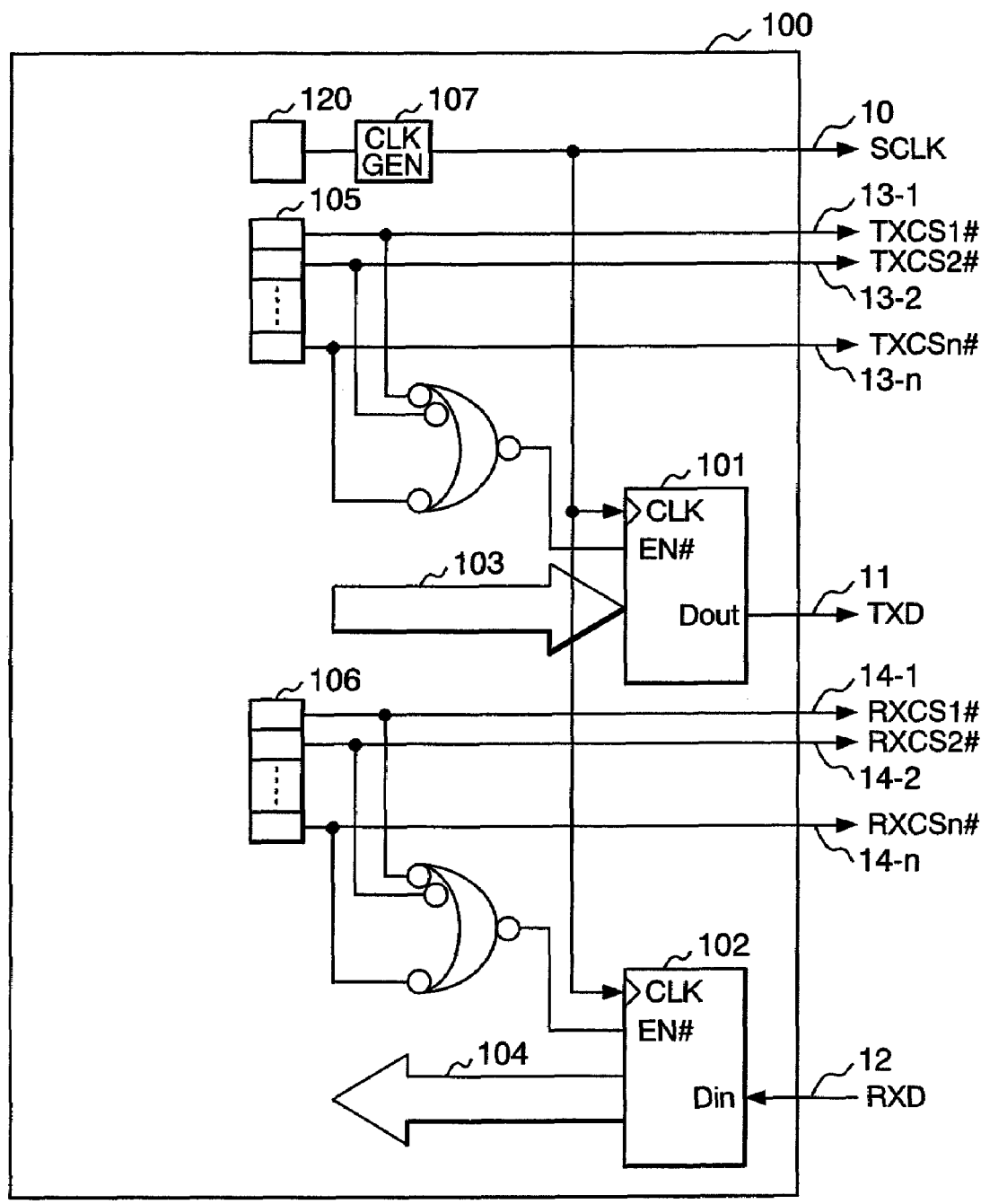
FIG. 13 shows an example of the configuration of a master node.

FIG. 13 shows an example of the configuration of a master node. A master node (main processor) 100 of this example includes a transmission-destination control register 105 and a reception-destination control register 106. A data transmission-destination and a data reception-destination are designated when they are setting in the destination control register 105 and 106 respectively. Specifically, among the signal lines TXCS1#(13-1) to TXCSn#(13-n) and RXCS1#(14-1) to RXCSn#(14-n), signal lines corresponding to the settings made in the registers are activated (low).

Transmission data is taken into the parallel-serial converter 101 in the form of parallel data 103. When any destination is designated in the destination control register 105, the parallel data is converted into serial data according to the clock SCLK10, and transmitted as a signal TXD11.

Reception data RXD12 is received with the serial-parallel converter 102, and converted into parallel data 104 according to the clock SCLK10.

The clock SCLK10 is produced by a clock production circuit 107. The clock SCLK10 causes the parallel-serial converter 101 and serial-parallel converter 102 to act, and is transmitted outside the master node (main processor) 100. Moreover, when a communication start register 120 is set up, the clock production circuit 107 produces a predetermined number of clock pulses and clears the communication start register 120.

For communication using the master node (main processor) 100 of this example, the transmission-destination control register 105 and/or the reception-destination control register 106 are set up, and transmission data is received as parallel data 103 with the parallel-serial converter 101. Thereafter, the communication start register 120 is set up. Consequently, communication is initiated. Finally, reception data is transmitted as parallel data 104 from the serial-parallel converter 102.

Figure 14:
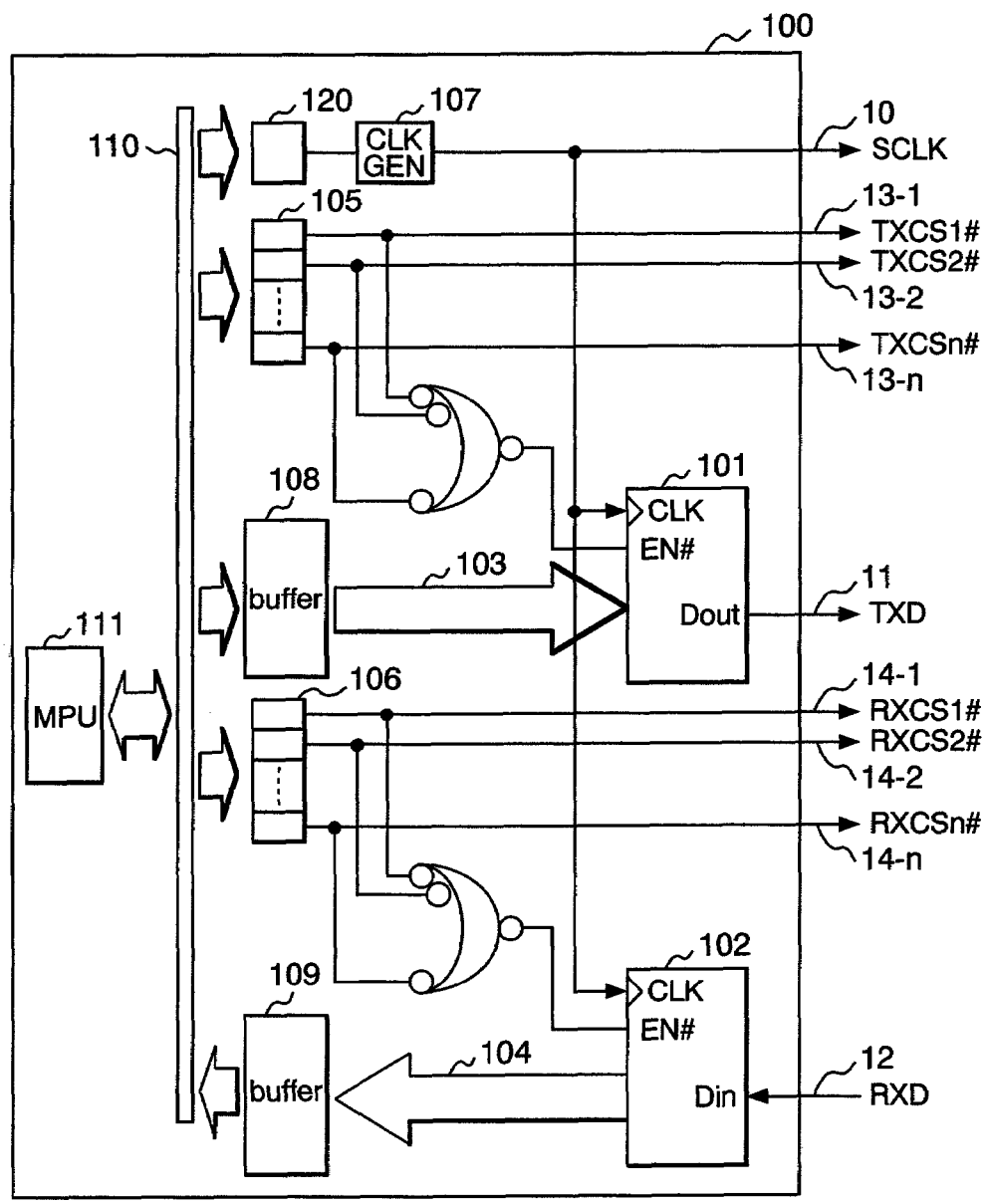
FIG. 14 shows an example of the configuration of a master node including a micro-processing unit.

FIG. 14 shows another example of the configuration of a master node. A master node (main processor) 100 of this example includes a micro-processing unit (MPU) 111. The transmission-destination control register 105, the reception-destination control register 106, and the communication start register 120 are set up through a bus 110 by the MPU 111.

Transmission data is written in the buffer 108 through the bus 110 by the MPU 111, taken as parallel data 103 into the parallel-serial converter 101, converted into serial data, and transmitted as a signal TXD11. Reception data converted as parallel data 104 by the serial-parallel converter 102 is stored in the buffer 109, and read into the MPU 111 through the bus 110 in response to a request issued from the MPU 111.

Figure 15:
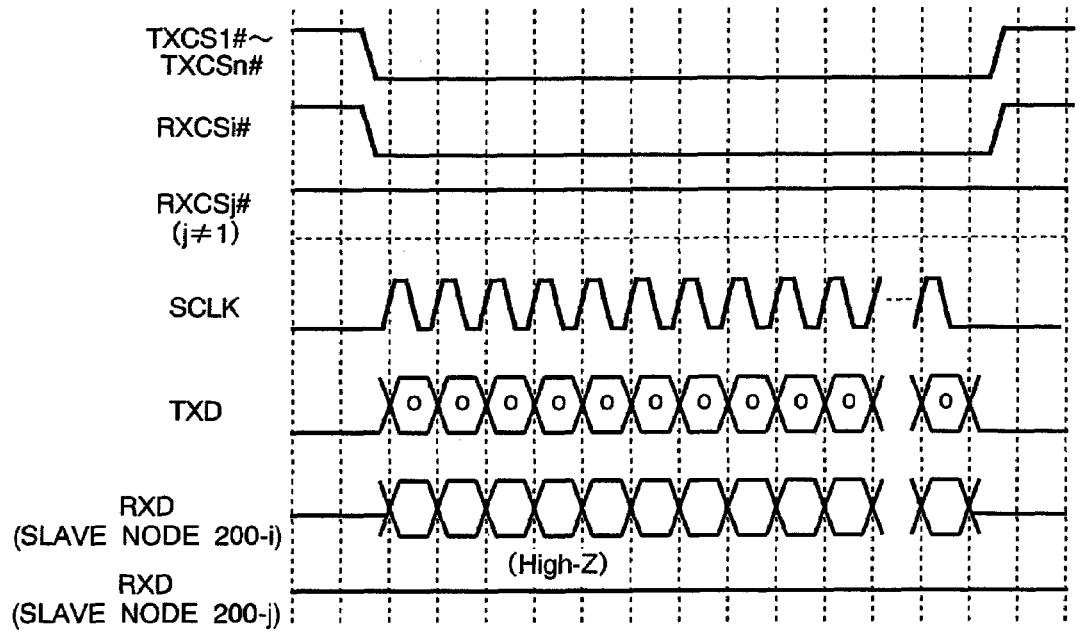
FIG. 15 is an explanatory diagram showing the waveforms of signals employed in a communication system in accordance with the present invention.

FIG. 15 is an explanatory diagram showing the waveforms of signals used in a communication system in accordance with the present invention. Prior to communication, signals TXCS1#(13-1) to TXCSn#(13-n) and RXCS1#(14-1) to RXCSn#(14-n) are transmitted in order to designate a party of transmission and a party of reception. In the example shown in FIG. 15, the signals TXCS1#(13-1) to TXCSn#(13-n) are all active (low); among the signals RXCS1#(14-1) to RXCSn#(14-n), the signal RXCSi#(14-1) alone is active (low) and the other signals are inactive.

At this time, the master node (main processor) 100 performs transmission of a signal TXD11 at the leading edge of a clock SCLK10, and the slave nodes (I/O processors) 200-1 to 200-n latch the signal TXD11 at the trailing edge of the clock SCLK10. Moreover, the slave node (I/O processor) 200-i alone performs transmission of a signal RXD12 at the leading edge of the clock SCLK10, and the other slave nodes do not transmit any signal but becomes into a high-impedance. Thus, the master node (main processor) 100 can transmit data simultaneously to the slave nodes (I/O processors) 200-1 to 200-n, and the master node (main processor) 100 can receive data from the specific slave node (I/O processor) 200-i.

Figure 16:
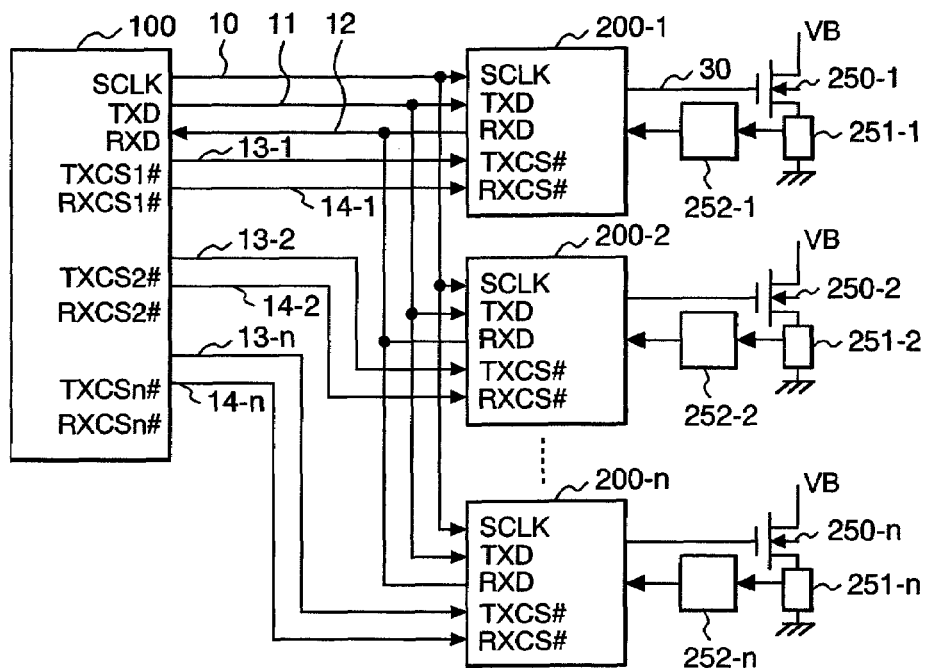
FIG. 16 shows an embodiment of control device in accordance with the present invention.

FIG. 16 shows an embodiment of a control device in accordance with the present invention. The present embodiment uses a master node (main processor) 100 including an MPU like the one shown in FIG. 14. Output semiconductor devices 250-1 to 250-n and actuators 251-1 to 251-n are connected to the respective slave nodes (I/O processors) 200-1 to 200-n. The output semiconductor devices control respective objects of control. In the illustrated embodiment, the output semiconductor devices 250-1 to 250-n serve as high-side drivers connected nearer to a power supply VB than the actuators. Needless to say, the output semiconductor devices 250-1 to 250-n may serve as low-side drivers connected nearer to a ground than the actuators. Moreover, the output semiconductor devices 250-1 to 250-n may be configured with H-bridges.

The actuators may be realized with solenoids or motors. When the actuator are realized with a motor, if the output semiconductor devices are H-bridges, the actuator can be reversely turned by reversing the polarity of an applied voltage. In the embodiment shown in FIG. 16, each of the slave nodes (I/O processors) 200-1 to 200-n is connected to one output semiconductor device and one actuator. Alternatively, each of the slave nodes may be connected to a plurality of output semiconductor devices and a plurality of actuators.

The actuators 251-1 to 251-n control respective controlled objects 252-1 to 252-n. The states of the controlled objects and the states of the actuators are, as illustrated, fed back to the respective slave nodes (I/O processors) 200-1 to 200-n. If each of the slave nodes (I/O processors) 200-1 to 200-n is, as shown in FIG. 12, provided with the MPU 210, the controlled objects 252-1 to 252-n and the slave nodes (I/O processors) 200-1 to 200-n can constitute a feedback control system independently of the master node (main processor) 100. In this case, the states of the objects of control or the states of the actuators may be fed back via sensors that are not shown.

For example, assuming that the control device in accordance with the present embodiment controls an internal combustion engine, the output semiconductor devices 250-1 to 250-n serve as a H-bridge for driving a motor which actuates an electronically-controlled throttle, an igniter driver for igniting an air-fuel mixture in a cylinder, an injector driver for driving an injector which injects fuel near the intake port of an intake pipe leading to a cylinder, an EGR valve driver for controlling a recirculation of exhaust gas, and a solenoid driver for controlling a transmission etc. Among these types of drivers, the igniter driver and the injector driver feed respective currents to the associated actuators for a predetermined period of time under a predetermined timing. Consequently, the ignition timing and the ignition energy, and the fuel injection timing and an amount of injected fuel are controlled. The H-bridge, the EGR valve driver, and the solenoid driver control respective average driving currents by pulse-width modulations that change pulse duration-width for feeding respective currents. Thereby, a throttle valve opening, an EGR valve opening, and a clutch engagement force exerted by a solenoid are respectively controlled. The H-bridge further controls a direction of a driving current to control a rotation direction of a motor for actuating the throttle valve. In this case, the states of the objects of control to be fed back include a rotation angle of the engine, a cooling water temperature of the engine, and an intake air flow rate of the engine. Types of sensors therefore include a crank angle sensor, a coolant temperature sensor, and an intake air flow meter.

In case of controlling an motor-driven brake device by one of the output semiconductor devices 250-1 to 250-n, the semiconductor device may be comprised of a H-bridge or a three-phase inverter which drives a motor for the motor-driven brake. In this case, the slave nodes (I/O processors) 200-1 to 200-n are preferably set for each of wheels (brakes). Moreover, the states of the controlled objects to be fed back include a force exerted in thrusting a brake pad (a thrust) and a wheel speed. Types of sensors include a pressure sensor and a wheel speed sensor.

Furthermore, in case of controlling a suspension including an electric actuator by one of the output semiconductor devices 250-1 to 250-n, the semiconductor device may be comprised of a H-bridge or half-bridge for driving the electric actuator. In this case, the slave nodes (I/O processors) 200-1 to 200-n are preferably set for each of wheels (suspensions).

Moreover, the states of the controlled objects to be fed back include the position and acceleration of each suspension. Moreover, types of sensors include a position sensor and an acceleration sensor.

According to the foregoing embodiments, an instruction issued from the master node (main processor) 100 is transmitted to the slave nodes (I/O processors) 200-1 to 200-*n* by the communication system in accordance with the present invention. Based on the instruction issued from the master node (main processor) 100, the slave nodes (I/O processors) 200-1 to 200-*n* can control the respective actuators 251-1 to 251-*n* via the output semiconductor devices 250-1 to 250-*n*. Moreover, since the instruction issued from the master node (main processor) 100 can be broadcasted to the slave nodes (I/O processors) 200-1 to 200-*n*, a transmission time required for the instruction can be shortened.

On the other hand, various pieces of information are transmitted from the slave nodes (I/O processors) 200-1 to 200-*n* to the master node (main processor) 100 owing to the communication system in accordance with the present invention. The pieces of information to be transmitted from each of the slave nodes (I/O processors) 200-1 to 200-*n* to the master node (main processor) 100 include: the actuator operating state and the controlled object-state provided by sensors that are not shown; the diagnosis result performed in each of the output semiconductor devices 250-1 to 250-*n* (overcurrent detected, short-circuit detected, breaking detected, or overheat detected); and the states of slave nodes (I/O processors) 200-1 to 200-*n* (error information concerning computing and controlling, or state transition information).

Figure 17:
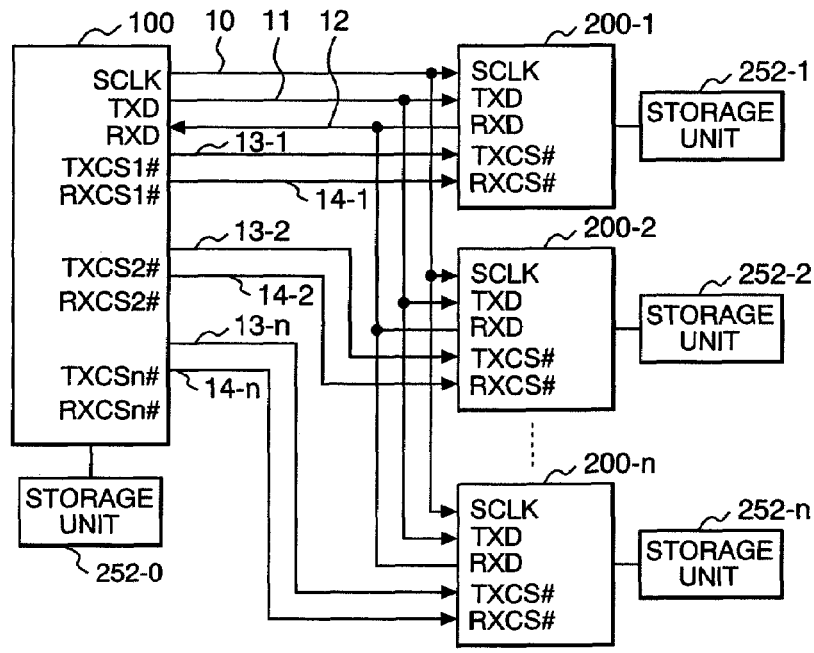
FIG. 17 shows an embodiment of an information processing system in accordance with the present invention.

FIG. 17 shows an embodiment of an information processing system in accordance with the present invention. The present embodiment uses a master node (main processor) 100 having an MPU like the one shown in FIG. 14 and slave nodes each including an MPU like the one shown in FIG. 12. A storage unit 252-0 is connected to the master node (main processor) 100, and storage units 252-1 to 252-*n* are connected to the respective slave nodes (I/O processors) 200-1 to 200-*n*. An ordinary semiconductor memory or magnetic disk drive may be adopted as the storage units 252-0 to 252-*n*.

The master node (main processor) 100 and slave nodes (I/O processors) 200-1 to 200-*n* use the respective storage units 252-0 to 252-*n* connected thereto to execute pieces of assigned processing. Required information can be exchanged via a communication system in accordance with the present invention, whereby actions well-organized as a whole can be accomplished. In particular, according to the communication system in which the present invention is implemented, since broadcasting of information from the master node (main processor) 100 to the slave nodes (I/O processors) 200-1 to 200-*n* can be performed, and simultaneous transmission and reception to or from different parties can be performed, efficiency in inter-node communication for information exchange can be improved.

For example, the master node (main processor) 100 transmits pieces of information, which is numerical values used for computing at each slave node, contents of computing, and types of computing etc., to the slave nodes (I/O processors) 200-1 to 200-*n*. On the other hand, each of the slave nodes (I/O processors) 200-1 to 200-*n* transmits pieces of information, which is a computing result and a computing state (computing in progress, computing terminated, error occurred, etc.), to the master node (main processor) 100. Thus, a decentralized processing system capable of performing high-performance information processing can be constructed as a whole.

FIG. 18 to FIG. 21 show embodiments concerning a method of transmitting output wave modifier information 19 and output timing information 21.

Figure 18:
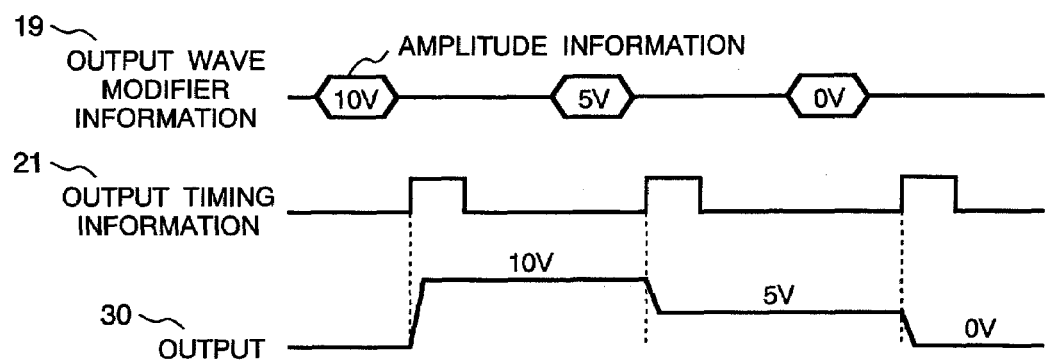
FIG. 18 shows an embodiment in which output wave modifier information signifies the amplitude of an output wave.

FIG. 18 shows the embodiment in which the output wave modifier information 19 provides amplitude information (output crest value) on output waves, and the leading edge of the output timing information 21 provides output timing. According to the present embodiment, an I/O processor (or an I/O device) 200 transmits an output 30, which represents an amplitude provided by the output wave modifier information 19, at the timing of the leading edge of the output timing information 21. In the illustrated example, the output wave modifier information 19 providing an amplitude of 10V is received at the first leading edge of the output timing information 21, thereby the output 30 representing the amplitude 10V is outputted. Thereafter, the output wave modifier information 19 providing an amplitude of 5V is received at the second leading edge of the output timing information 21, thereby the output 30 representing the amplitude 5V is outputted. After that, the output wave modifier information 0 providing an amplitude of 0 V is received at the third leading edge of the output timing information 21, thereby the output 30 representing the amplitude 0V is outputted.

Figure 19:
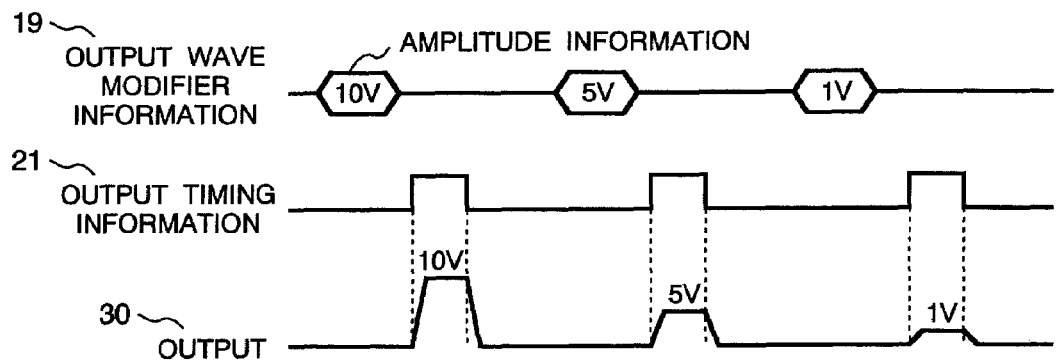
FIG. 19 shows an embodiment in which output wave modifier information signifies the amplitude of an output wave.

FIG. 19 shows an embodiment in which the output wave modifier information 19 provides amplitude information on output waves, the leading edge of the output timing information 21 signifies the timing when the wave of an output signal 30 rises, and the trailing edge of the output timing information 21 signifies the timing when the wave of the output signal 30 drops. According to the present embodiment, an I/O processor (or an I/O device) 200 outputs the output 30, which represents an amplitude signified by the output wave modifier information 19, during a period from the timing of the leading edge of the output timing information 21 to the trailing edge thereof. In the illustrated example, the output wave modifier information 19 signifying an amplitude of 10V is received at the first leading edge of the output timing information 21. The output 30 representing 10V is outputted during a period from the leading edge of the output timing information 21 to the trailing edge thereof. Thereafter, the output wave modifier information 19 signifying an amplitude of 5 V is received at the second leading edge of the output timing information 21, thereby the output 30 representing the amplitude 5 V is outputted. Thereafter, the output wave modifier information 1 signifying an amplitude of 1V is received at the third leading edge of the output timing information, thereby the output 30 representing the amplitude 1V is outputted.

Figure 20:
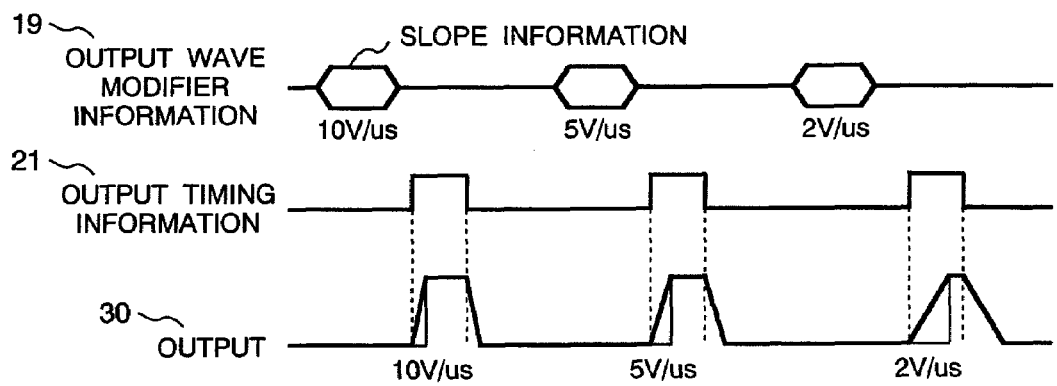
FIG. 20 shows an embodiment in which output wave modifier information signifies the slope of an output wave.

FIG. 20 shows an embodiment in which the output wave modifier information 19 signifies slopes of output waves. According to the present embodiment, an I/O processor (or an I/O device) 200 outputs an output 20, which represents the slope signified by the output wave modifier information 19, at the timing of the leading edge of the output timing information 21 and the timing of the trailing edge thereof. In the illustrated example, the output wave modifier information 19 signifying a slope of 10 V/us is received at the first leading edge of the output timing information 21, thereby the output 30 representing the slope 10 V/us is outputted, at the leading and trailing edges of the output timing information 21. The output wave modifier information 19 signifying a slope of 5 V/us is received at the second leading edge of the output timing information 21, thereby the output 30 representing the slope 5V/us is outputted. After that, the output wave modifier information 19 signifying a slope of 2 V/us is outputted at the third leading edge of the output timing information, thereby the output 30 representing the slope 2V/us is outputted.

Figure 21:
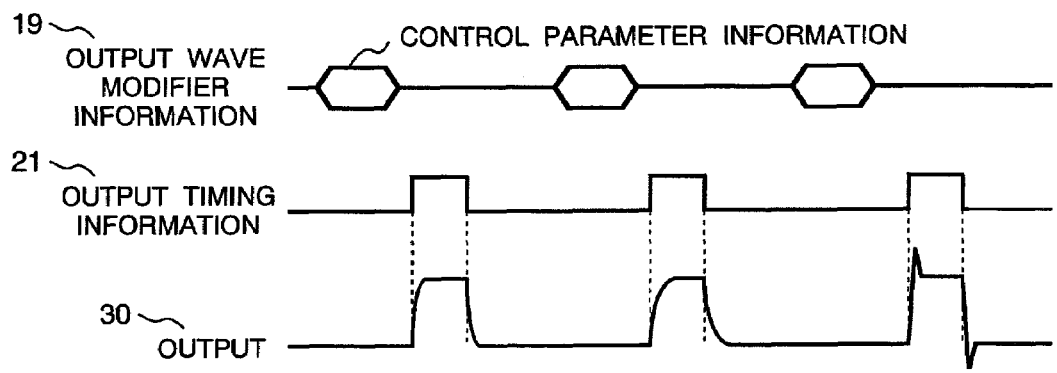
FIG. 21 shows an embodiment in which output wave modifier information signifies a control parameter relevant to an output wave.

FIG. 21 shows an embodiment in which the output wave modifier information 19 signifies control parameters for output wave. In the present embodiment, an I/O processor (or an I/O device) 200 controls the output 30 through feedback control, and the output wave modifier information 19 signifies parameters for the feedback control. Like the embodiment shown in FIG. 16, in the present embodiment, an I/O processor (or an I/O device) 200 has a feedback input terminal via which the value of the output 30 is fed back. A feedback input and a set value are compared with each other or a difference between them is calculated, whereby the value of the output 30 is modified. Like the embodiment shown in FIG. 18, the set value may be the amplitude information on an output wave provided by the output wave modifier information 19.

In the illustrated example, a control parameter indicating a lower response speed than a control parameter contained in the first output is contained in the second output in the form of the output wave modifier information 19. A control parameter indicating a very high response speed is contained in the third output, and the output 30 exhibits an overshoot.

Likewise, even when the I/O processor (or I/O device) 200 controls the output 30 by feed forward control, the output wave modifier information 19 can be used to contain a control parameter.

Various formats are conceivable for the output wave modifier information 19. For example, amplitude information (output crest value), a slope, a control parameter, or any other information may be expressed in binary notation or in ASCII and contained in a predetermined field in serial data.

The embodiments in which the output wave modifier information 19 provides various pieces of information have been described so far. The output wave modifier information 19 may provide a plurality of pieces of information. In this case, serial data is segmented into fields in which the plurality of pieces of information is contained, and the pieces of information contained in the respective fields are expressed in binary notation or ASCII.

Figure 22:
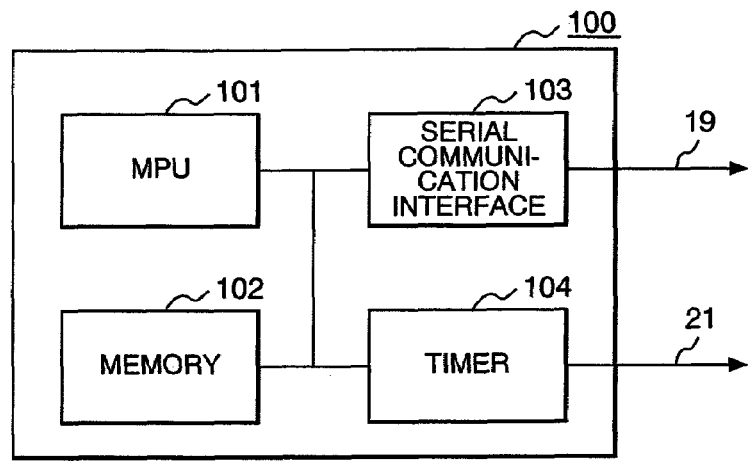
FIG. 22 shows an example of a main processor.

FIG. 22 shows an example of a main processor 100. The main processor 100 of this example includes a micro-processing unit (MPU) 101, a memory 102, a serial communication interface 103, and a timer 104. The micro-processing unit (MPU) 101 stores required information in the memory 102, and determines output timing and an output wave. For transmission of information (output wave modifier information 19) based on the determined output wave, the MPU 101 initiates communication via the serial communication interface 103. Furthermore, the MPU 101 sets up the timer 104 on the basis of the determined output timing.

Figure 23:
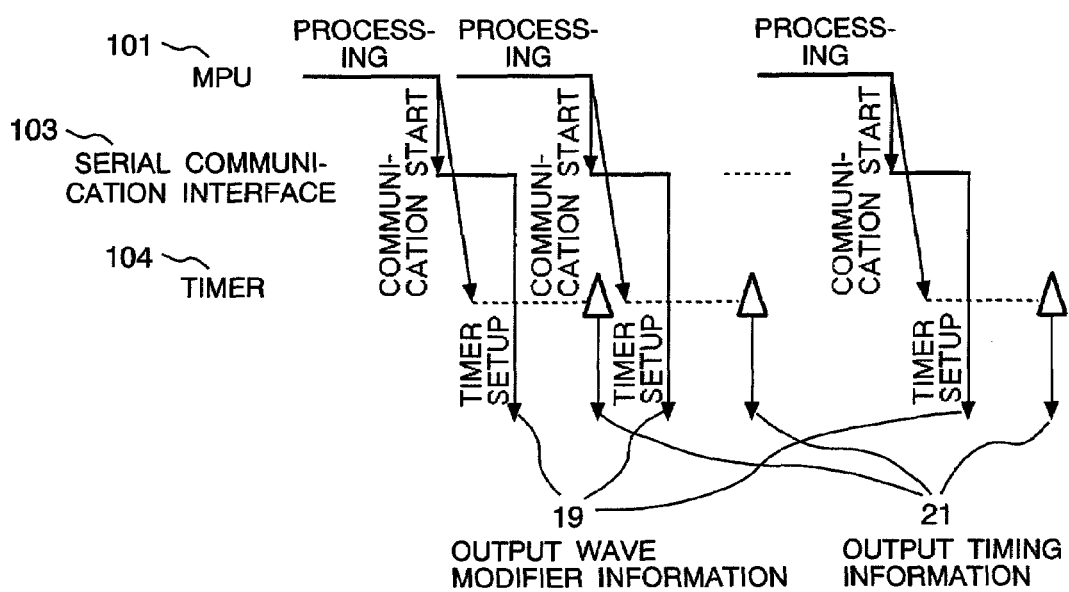
FIG. 23 shows an example of actions to be performed by a main processor 100.

The serial communication interface 103 transmits the output wave modifier information 19 to the I/O processors (or I/O device) 200 through a single serial channel responsively to initiation of communication. The timer 104 transmits the output timing information 21 at a predetermined time instant responsively to the timer setup. Moreover, as shown in FIG. 23, when pieces of processing are pipelined, the performance of control device can be improved. The MPU 101 performs the processing of controlling an output. The processing is performed in order to obtain the output timing and output wave (output wave modifier information 19).

The MPU 101 causes an initiation of communication to the serial communication interface 103 on the basis of a result of processing. The initiation of communication is achieved by writing predetermined information in a control register included in the serial communication interface 103 and writing the output wave modifier information 19 as a message, which should be transmitted to a message buffer. Responsively to the initiation of communication, the serial communication interface 103 transmits the output wave modifier information 19, which is written in the message buffer, to the I/O processor 200-i.

Moreover, the MPU 101 sets up the timer 104 on the basis of the result of processing. Timer setup is achieved by writing a counter value, which indicates the timing of transmitting a signal to a register included in the timer 104. When the counter value reaches the set value written in the register, the timer 104 transmits an output, that is, timing information 21 to the I/O processor 200-i.

INDUSTRIAL APPLICABILITY

According to the present invention, in addition to the fast on-off timing, output wave-instructive information such as an amplitude or a slope can be transmitted from a main processor to I/O processors (or I/O devices) through a small number of signal lines. Consequently, job assignment is achieved in such a manner that the main processor is responsible for overall control of an output, and that the I/O processors (or I/O devices) are in charge of fine control of the output. Consequently, the performance of control device can be improved. According to the present invention, a transmission signal sent from a master node can be received by a plurality of slave nodes. Moreover, a broadcast feature not causing confliction of reception signals to be received by the master node can be realized.

What is claimed is:

1. A communication system comprising a master node and a plurality of slave nodes, and the system in which the master node and slave nodes, and the system in which the master node and salve nodes communicate with one another, wherein the master node comprises:

a clock transmission means for transmitting a clock signal to the plurality of slave nodes;

a means for transmitting a group of communication selection signals, which signifies whether each slave node is selected as a party of signal transmission to or from the master node and which signifies a direction of communication, to the slave nodes;

a means for transmitting data to the plurality of slave nodes synchronously with the clock signal; and a means for receiving data sent from a selected slave node synchronously with the clock signal;

wherein the group of communication selection signals includes a first selection signal signifying whether each slave node is selected as a receiver of signal transmission from the master node, and a second selection signal signifying whether each slave node is selected as a sender of signal transmission to the master node; and the second selection signal is used to select at most one slave node simultaneously.

2. The communication system according to claim 1, wherein each of the slave nodes comprises:

a means for, when the group of communication selection signals selects the slave node as a party of transmission from the master node, receiving transmission data sent from the master node synchronously with the clock signal; and a means for, when the group of communication selection signals select the slave node as a party of transmission to the master node, sending transmission data to the master node synchronously with the clock signal.

3. A communication system comprising a master node and a plurality of slave nodes, and the system in which the master node and slave nodes, and the system in which the master node and salve nodes communicate with one another, wherein the master node comprises:

a clock transmission means for transmitting a clock signal to the plurality of slave nodes;

a means for transmitting a group of communication selection signals, which signifies whether each slave node is selected as a party of signal transmission to or from the master node and which signifies a direction of communication, to the slave nodes;

a means for transmitting data to the plurality of slave nodes synchronously with the clock signal; and a means for receiving data sent from a selected slave node synchronously with the clock signal;

wherein the group of communication selection signals includes a first selection signal signifying whether each slave node is selected as a party of signal transmission to or from the master node, and a second selection signal signifying a direction of signal transmission between the master node and the slave node.

4. Control devices comprising a master node, a plurality of slave nodes, actuators connected to the respective slave nodes via respective switching means, and a communication system in which the master node and the slave nodes are communicated with one another, and the control device which controls the actuators in response to a instruction issued from the master node, wherein, the master node comprises:

a clock transmission means for transmitting a clock signal to the plurality of slave nodes;

a means for transmitting a group of communication selection signals, which signifies whether each slave node is selected as a party of signal transmission to or from the master node and which signifies a direction of communication, to the slave nodes;

a means for transmitting data to the plurality of slave nodes synchronously with the clock signal; and a means for receiving data sent from a selected slave node synchronously with the clock signal;

wherein each of the slave nodes comprises:

a means for, when the group of communication selection signals selects the slave node as a party of transmission from the master node, receiving transmission data sent from the master node synchronously with the clock signal; and a means for, when the group of communication selection signals selects the slave node as a party of transmission to the master node, sending transmission data to the master node synchronously with the clock signal;

wherein the group of communication selection signals includes a first selection signal signifying whether each slave node is selected as a receiver of signal transmission from the master node, and a second selection signal signifying whether each slave node is selected as a sender of signal transmission to the master node; and the second selection signal is used to select at most one slave node simultaneously.

5. Control devices comprising a master node, a plurality of slave nodes, actuators connected to the respective slave nodes via respective switching means, and a communication system in which the master node and the slave nodes are communicated with one another, and the control device which controls the actuators in response to a instruction issued from the master node, wherein, the master node comprises:

a clock transmission means for transmitting a clock signal to the plurality of slave nodes;

a means for transmitting a group of communication selection signals, which signifies whether each slave node is selected as a party of signal transmission to or from the master node and which signifies a direction of communication, to the slave nodes;

a means for transmitting data to the plurality of slave nodes synchronously with the clock signal; and a means for receiving data sent from a selected slave node synchronously with the clock signal;

wherein each of the slave nodes comprises:

a means for, when the group of communication selection signals selects the slave node as a party of transmission from the master node, receiving transmission data sent from the master node synchronously with the clock signal; and a means for, when the group of communication selection signals selects the slave node as a party of transmission to the master node, sending transmission data to the master node synchronously with the clock signal;

wherein the group of communication selection signals includes a first selection signal signifying whether each slave node is selected as a party of signal transmission to or from the master node, and a second selection signal signifying a direction of signal transmission between the master node and the slave node.

6. An information processing system comprising a master node which includes a microprocessor and performs information processing, a plurality of slave nodes each of which includes a microprocessor and performs information processing, and a communication system in which the master node and the slave nodes communicate with one another, wherein the master node comprises:

a clock transmission means for transmitting a clock signal to the plurality of slave nodes;

a means for transmitting a group of communication selection signals, which signifies whether each slave node is selected as a party of signal transmission to or from the master node and which signifies a direction of communication, to the slave nodes;

a means for transmitting data to the plurality of slave nodes synchronously with the clock signal; and a means for receiving data sent from a selected slave node synchronously with the clock signal;

wherein each of the slave nodes comprises:

a means for, when the group of communication selection signals selects the slave node as a party of transmission from the master node, receiving transmission data sent from the master node synchronously with the clock signal; and a means for, when the group of communication selection signals selects the slave node as a party of transmission to the master node, sending transmission data to the master node synchronously with the clock signal;

wherein the group of communication selection signals includes a first selection signal signifying whether each slave node is selected as a receiver of signal transmission from the master node, and a second selection signal signifying whether each slave node is selected as a sender of signal transmission to the master node; and the second selection signal is used to select at most one slave node simultaneously.

7. An information processing system comprising a master node which includes a microprocessor and performs information processing, a plurality of slave nodes each of which includes a microprocessor and performs information processing, and a communication system in which the master node and the slave nodes communicate with one another, wherein the master node comprises:

a clock transmission means for transmitting a clock signal to the plurality of slave nodes;

a means for transmitting a group of communication selection signals, which signifies whether each slave node is selected as a party of signal transmission to or from the master node and which signifies a direction of communication, to the slave nodes;

a means for transmitting data to the plurality of slave nodes synchronously with the clock signal; and a means for receiving data sent from a selected slave node synchronously with the clock signal;

wherein each of the slave nodes comprises:

a means for, when the group of communication selection signals selects the slave node as a party of transmission from the master node, receiving transmission data sent from the master node synchronously with the clock signal; and a means for, when the group of communication selection signals selects the slave node as a party of transmission to the master node, sending transmission data to the master node synchronously with the clock signal;

wherein the group of communication selection signals includes a first selection signal signifying whether each slave node is selected as a party of signal transmission to or from the master node, and a second selection signal signifying a direction of signal transmission between the master node and the slave node.

8. Real-time control device comprising a main node for determining output timings and output waves, and a plurality of I/O nodes for transmitting outputs with respective output waves at respective output timings, the control device further comprising:

a common serial channel through which the main node and the plurality of I/O nodes are connected to one another; and individual signal lines through which the main node and the respective I/O nodes are connected to each other, wherein information of the output timings determined by the main node are transmitted from the main node to the plurality of I/O nodes through the individual signal lines; and information of the output waves determined by the main node are transferred from the main node to the plurality of I/O nodes through the common serial channel;

wherein the main node comprises a microprocessor unit for determining the output timings and the output waves, a serial communication interface via which the information of the output waves are transmitted, and a timer for producing the output timing information.

9. The real-time control device according to claim 8, wherein the main node comprises a means for transmitting an I/O node selection signal that signifies whether each I/O node is designated as a party of transmission to or from the main node, and a means for producing a transmission clock; and the main node transmits data synchronously with the transmission clock; and when an I/O node selection signal with which each I/O node is designated is active, the selected I/O node transmits data synchronously with the transmission clock.

10. The real-time control device according to claim 8, wherein the main processor and I/O nodes are connected to one another owing the communication system set forth in claim 2, the main processor corresponds to the master node, and the I/O nodes correspond to the slave nodes.

* * * * *

UNITED STATES PATENT AND TRADEMARK OFFICE
CERTIFICATE OF CORRECTION

PATENT NO. : 7,680,228 B2 Page 1 of 1
APPLICATION NO. : 10/578188
DATED : March 16, 2010
INVENTOR(S) : Nobuyasu Kanekawa It is certified that error appears in the above-identified patent and that said Letters Patent is hereby corrected as shown below:

Title Page, Item (86) should read: --(86) PCT No.: PCT/JP2004/014470--.

Signed and Sealed this

Eighth Day of June, 2010

David J. Kappos
*Director of the United States Patent and Trademark Office*